(12) United States Patent
Chang et al.

(10) Patent No.: US 9,791,748 B2
(45) Date of Patent: *Oct. 17, 2017

(54) LIQUID CRYSTAL DISPLAY

(71) Applicant: Samsung Display Co., Ltd., Yongin (KR)

(72) Inventors: Sun-Young Chang, Bucheon-si (KR); Chul Huh, Yongin-si (KR); Sang-Hun Lee, Suwon-si (KR); Gwan-Soo Kim, Asan-si (KR); Yui-Ku Lee, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,632

(22) Filed: Sep. 16, 2014

(65) Prior Publication Data

US 2015/0002775 A1     Jan. 1, 2015

Related U.S. Application Data

(63) Continuation of application No. 12/790,216, filed on May 28, 2010, now Pat. No. 8,854,579.

(30) Foreign Application Priority Data

Nov. 23, 2009    (KR) .................. 10-2009-0113477

(51) Int. Cl.
  *G02F 1/1339* (2006.01)
  *G02F 1/1335* (2006.01)
  (Continued)

(52) U.S. Cl.
  CPC .... *G02F 1/13394* (2013.01); *G02F 1/133512* (2013.01); *G02F 1/136227* (2013.01);
  (Continued)

(58) Field of Classification Search
  CPC ....... G02F 1/13394; G02F 2001/13388; G02F 2001/13396; G02F 1/133512; G02F 2001/13398; G02F 1/136227
  (Continued)

(56) References Cited

U.S. PATENT DOCUMENTS 5,798,806 A    8/1998 Tsutsui et al.
7,961,288 B2   6/2011 Jang
(Continued)

FOREIGN PATENT DOCUMENTS

CN    1573491    2/2005
CN    1892346    1/2007
(Continued)

OTHER PUBLICATIONS

Computer translation of JP 2006-091055, Apr. 2006, pp. 1-18.*
(Continued)

*Primary Examiner* — Nathaniel R Briggs
*Assistant Examiner* — William Peterson
(74) *Attorney, Agent, or Firm* — H.C. Park & Associates, PLC

(57) ABSTRACT

An exemplary embodiment of the present invention relates to a liquid crystal display having a display area and a non-display area which includes a first substrate and a second substrate facing the first substrate, a layer having a first opening, a spacer disposed in the first opening, and a first light blocking member disposed in the non-display area. The spacer is disposed in the first opening to maintain an interval between the first substrate and the second substrate. The spacer and the first light blocking member include the same material.

17 Claims, 8 Drawing Sheets

(51) Int. Cl.
    *G02F 1/1362*     (2006.01)
    *G02F 1/1333*     (2006.01)
(52) U.S. Cl.
    CPC .............. *G02F 2001/13396* (2013.01); *G02F 2001/13398* (2013.01); *G02F 2001/133388* (2013.01)
(58) Field of Classification Search
    USPC ............... 349/110, 122, 155, 156, 157, 187; 445/24
    See application file for complete search history.

(56)            References Cited

U.S. PATENT DOCUMENTS

| 8,081,286 | B2 | 12/2011 | Kim et al. | |
|---|---|---|---|---|
| 2002/0012083 | A1 | 1/2002 | Tanaka et al. | |
| 2004/0238823 | A1 | 12/2004 | Lee et al. | |
| 2005/0179853 | A1* | 8/2005 | Chen et al. .................. | 349/155 |
| 2007/0019151 | A1 | 1/2007 | Heo et al. | |
| 2008/0246905 | A1 | 10/2008 | Chen et al. | |
| 2008/0252841 | A1 | 10/2008 | Funahata et al. | |
| 2009/0079927 | A1 | 3/2009 | Yamamoto et al. | |
| 2009/0185094 | A1* | 7/2009 | Lee et al. ........................ | 349/46 |
| 2010/0033646 | A1 | 2/2010 | Baek et al. | |
| 2010/0045920 | A1* | 2/2010 | Kwak .................. | G02F 1/1339 349/153 |
| 2010/0134731 | A1 | 6/2010 | Jeon et al. | |

FOREIGN PATENT DOCUMENTS

| CN | 101435943 | 5/2009 |
|---|---|---|
| JP | 2000-075305 | 3/2000 |
| JP | 2000338503 | 12/2000 |
| JP | 2002-040485 | 2/2002 |
| JP | 2002-214593 | 7/2002 |
| JP | 2003121858 | 4/2003 |
| JP | 2003-172937 | 6/2003 |
| JP | 2003302638 | 10/2003 |
| JP | 2004245952 | 9/2004 |
| JP | 2005-084230 | 3/2005 |
| JP | 2005-242309 | 9/2005 |
| JP | 2006-018275 | 1/2006 |
| JP | 2006-091055 | 4/2006 |
| JP | 2007-047280 | 2/2007 |
| JP | 2007-233059 | 9/2007 |
| JP | 2007-279674 | 10/2007 |
| JP | 2008-209563 | 9/2008 |
| JP | 2008-304507 | 12/2008 |
| JP | 2009-169162 | 7/2009 |
| JP | 2010-014870 | 1/2010 |
| KR | 10-2004-0103629 | 12/2004 |
| KR | 10-2006-0000279 | 1/2006 |
| KR | 10-2007-0060293 | 6/2007 |
| KR | 10-2007-0075830 | 7/2007 |
| KR | 10-2007-0078553 | 8/2007 |
| KR | 10-2007-0118886 | 12/2007 |
| KR | 10-2008-0073825 | 8/2008 |
| KR | 10-2008-0082086 | 9/2008 |
| KR | 10-2009-0003830 | 1/2009 |

OTHER PUBLICATIONS

Non-Final Office Action issued Dec. 5, 2013, in U.S. Appl. No. 12/790,216.
Final Office Action issued Aug. 30, 2013, in U.S. Appl. No. 12/790,216.
Non-Final Office Action issued Feb. 20, 2013, in U.S. Appl. No. 12/790,216.
Chinese Office Action dated Jan. 12, 2015, in Chinese Patent Application No. 201010557392.3.

\* cited by examiner

LIQUID CRYSTAL DISPLAY

CROSS-REFERENCE TO RELATED APPLICATION

This application is a continuation of U.S. patent application Ser. No. 12/790,216, filed on May 28, 2010, and claims priority from and the benefit of Korean Patent Application No. 10-2009-0113477, filed on Nov. 23, 2009, each of which is hereby incorporated by reference for all purposes as if fully set forth herein.

BACKGROUND OF THE INVENTION

1. Field of the Invention

The present invention relates to a liquid crystal display.

2. Discussion of the Background

A liquid crystal display (LCD) is one of the most widely used flat panel displays (FPD), and is composed of two display panels on which electrodes are formed, and a liquid is crystal layer interposed between the two display panels. A voltage is applied to the electrodes to generate an electric field on the liquid crystal layer, and the orientation of liquid crystal molecules in the liquid crystal layer is determined and the polarization of incident light is controlled through the generated electric field to display an image.

A widely used LCD has a structure in which field generating electrodes are respectively formed on two display panels. Among the two display panels, a plurality of pixel electrodes and thin film transistors are arranged in a matrix format on one display panel (hereafter referred to as a "thin film array panel"), color filters of red, green, and blue and a light blocking member are formed on the other display panel (hereafter referred to as a "common electrode panel"), and one common electrode covers the entire surface of the other display panel.

However, when the pixel electrodes and the color filters are formed on different display panels, it may be difficult to correctly align the pixel electrodes and the color filters, which may cause an alignment error. To solve this problem, a color filter on array (COA) structure may be used in which the pixel electrodes and the color filters may be formed on the same display panel.

Also, when considering a combination margin of the thin film transistor array panel and the common electrode panel, a light blocking member such as a black matrix may be formed with a larger than predetermined size. However, the aperture ratio may be decreased by the size of the black matrix so that the black matrix may alternatively be formed in the thin film transistor array panel.

An interval of the liquid crystal layer between two display panels is referred to as a cell gap, and the cell gap influences general operation characteristics of the LCD such as response speed, contrast ratio, viewing angle, and luminance uniformity. If the cell gap is not is uniform, a uniform image may not be displayed on the whole screen, which may deteriorate the display quality. Accordingly, a plurality of spacers may be formed on one of the two panels to maintain the uniform cell gap throughout the whole region of the substrate.

The light blocking member including the black matrix prevents light leakage at the boundary of the pixels and a non-display area at the circumference of the display area. The spacer and the light blocking member may be simultaneously formed to simplify a manufacturing process. However, when the height of the spacer is low, it may be difficult to form the light blocking member with sufficient optical density to prevent light leakage in the non-display area.

SUMMARY OF THE INVENTION

Exemplary embodiments of the present invention provide a light blocking member arranged in a non-display area of an LCD which is formed with a spacer.

Additional features of the invention will be set forth in the description which follows, and in part will be apparent from the description, or may be learned by practice of the invention.

An exemplary embodiment of the present invention discloses an LCD including a display area and a non-display. The LCD includes a first substrate and a second substrate facing the first substrate, a layer having a first opening, a spacer disposed in the first opening, and a first light blocking member disposed in the non-display area. The spacer is disposed in the first opening to maintain an interval between the first substrate and the second substrate. The spacer and the first light blocking member include the same material.

An exemplary embodiment of the present invention also discloses a manufacturing method of an LCD including a display area and a non-display. The method is includes coupling a first substrate and a second substrate together, forming a layer having a first opening on the first substrate, forming a spacer disposed in the first opening, the spacer to maintain an interval between the first substrate and the second substrate, and forming a first light blocking member in the non-display area. The spacer and the first light blocking member are simultaneously formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
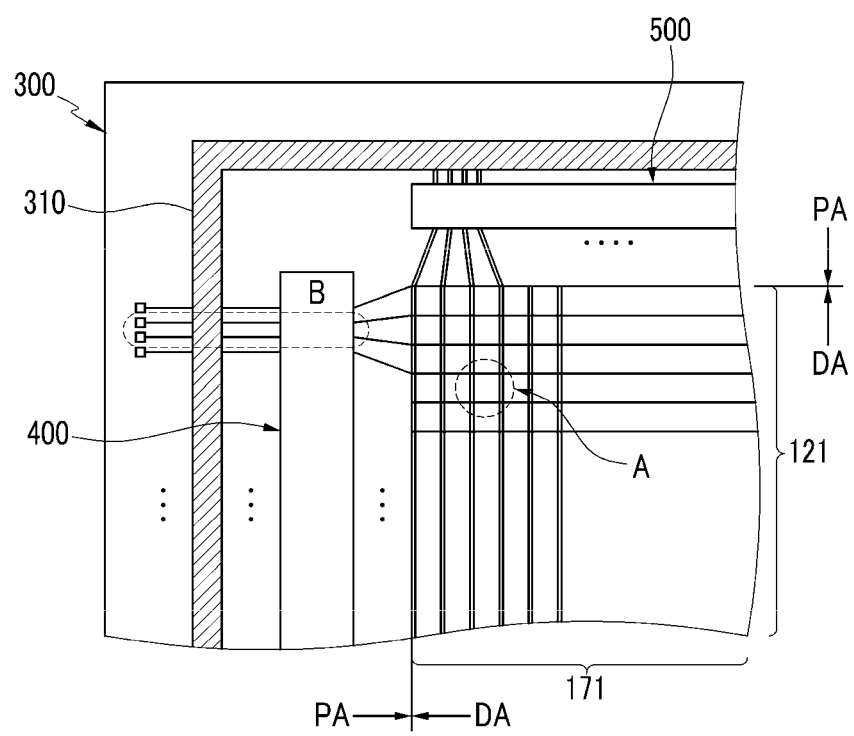
FIG. 1 is a layout view of an LCD according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
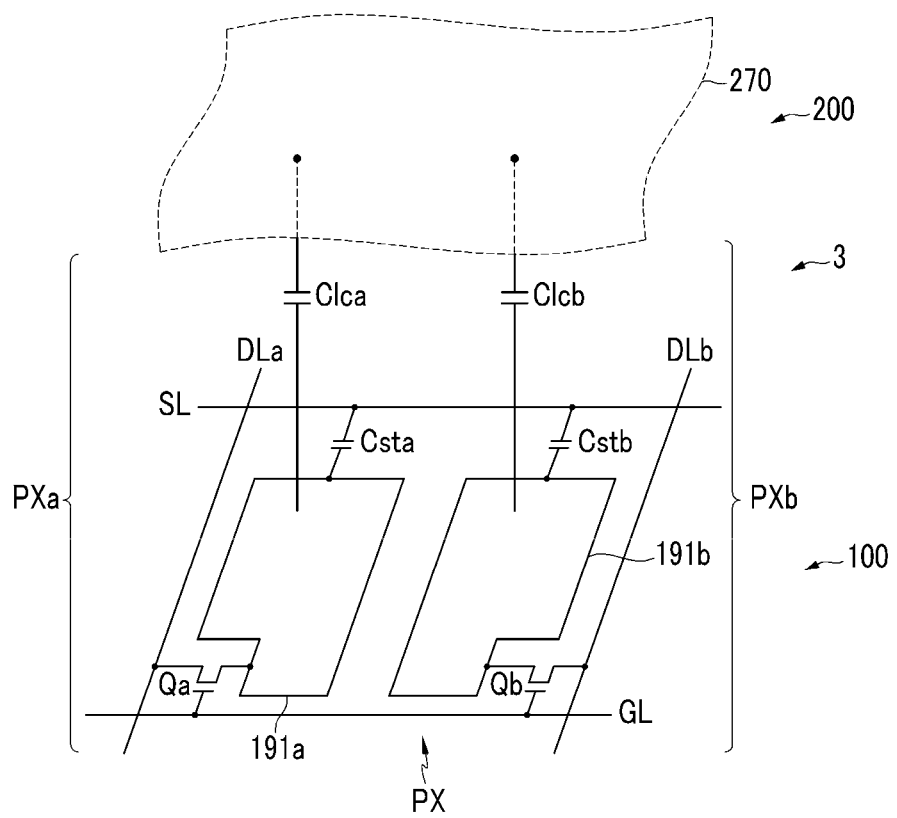
FIG. 2 is a layout view of an equivalent circuit diagram of one pixel of a LCD according to an exemplary embodiment of the present invention.

FIG. 1 is a layout view of an LCD according to an exemplary embodiment of the present invention. FIG. 2 is a layout view of an equivalent circuit diagram of one pixel of an LCD according to an exemplary embodiment of the present invention.

Referring to FIG. 1 and FIG. 2, the LCD according to an exemplary embodiment of the present invention includes a liquid crystal panel assembly 300 and a gate driver 400 and a data driver 500 connected thereto, a gray voltage generator (not shown) connected to the data is driver 500, a light source unit (not shown) to provide light to the liquid crystal panel assembly 300, a light source driver (not shown) to control the light source unit (not shown), and a signal controller (not shown).

The gate driver 400 or the data driver 500 may be formed on the lower panel 100 of the liquid crystal panel assembly 300, or may be formed separately in the shape of an integrated circuit (IC) chip.

The liquid crystal panel assembly 300 includes lower and upper panels 100 and 200, and a liquid crystal layer 3 interposed between the two panels 100 and 200. As shown in FIG. 1, a plurality of gate lines 121 proceed in the row direction, and a plurality of data lines 171 proceed in the column direction, in the liquid crystal panel assembly 300. A plurality of pixels are connected to the gate and data lines 121 and 171 and arranged roughly in the form of a matrix. A sealant 310 is formed at the outer boundary of the liquid crystal panel assembly 300 so as to seal the liquid crystal molecules of the liquid crystal layer 3.

The liquid crystal layer 3 may have positive (+) or negative (−) dielectric anisotropy, and liquid crystal molecules of the liquid crystal layer 3 may be aligned such that directors thereof stand substantially parallel or perpendicular to the surface of the two display panels 100 and 200 when an electric field is not applied thereto.

Alignment layers (not shown) may be formed on the inner surfaces of the display panels 100 and 200. The alignment layers may be vertical alignment layers. Polarizers (not shown) may be formed on the outer surfaces of the display panels 100 and 200.

Referring to FIG. 2, an LCD according to an exemplary embodiment of the present invention includes signal lines including a plurality of gate lines GL, a plurality of pairs of data lines DLa and DLb, and a plurality of storage electrode lines SL, and a plurality of pixels PX connected thereto.

The pixels PX include a pair of sub-pixels PXa and PXb, which include switching elements Qa and Qb, liquid crystal capacitors Clca and Clcb, and storage capacitors Csta and Cstb, respectively.

The switching elements Qa and Qb are three-terminal elements such as thin film transistors formed on the lower panel 100. The control terminals of the switching elements Qa and Qb are connected to the gate lines GL, the input terminals thereof are connected to the data lines DLa and DLb, and the output terminals thereof are connected to the liquid crystal capacitors Clca and Clcb and the storage capacitors Csta and Cstb, respectively.

The liquid crystal capacitors Clca and Clcb have sub-pixel electrodes 191a and 191b and a common electrode 270 as two terminals, and the liquid crystal layer 3 is interposed between the two terminals as a dielectric.

The storage capacitors Csta and Cstb, which assist the liquid crystal capacitors Clca and Clcb, are formed by overlapping the storage electrode line SL with the sub-pixel electrodes 191a and 191b and interposing an insulator, and a predetermined voltage such as a common voltage Vcom is applied to the storage electrode line SL.

The voltages charged at the two liquid crystal capacitors Clca and Clcb slightly differ from each other. For example, the data voltage applied to one of the liquid crystal capacitors Clca is established to be always lower or higher than the data voltage applied to the other liquid crystal capacitor Clcb. When the voltages of the two liquid crystal capacitors Clca and Clcb are properly controlled, an image viewed from the side of the LCD maximally approximates an image viewed from the front of the LCD, thereby improving the lateral visibility of the LCD.

An LCD according to an exemplary embodiment of the present invention will be described in detail with reference to FIG. 3, FIG. 4, FIG. 5, and FIG. 6.

Figure 3:
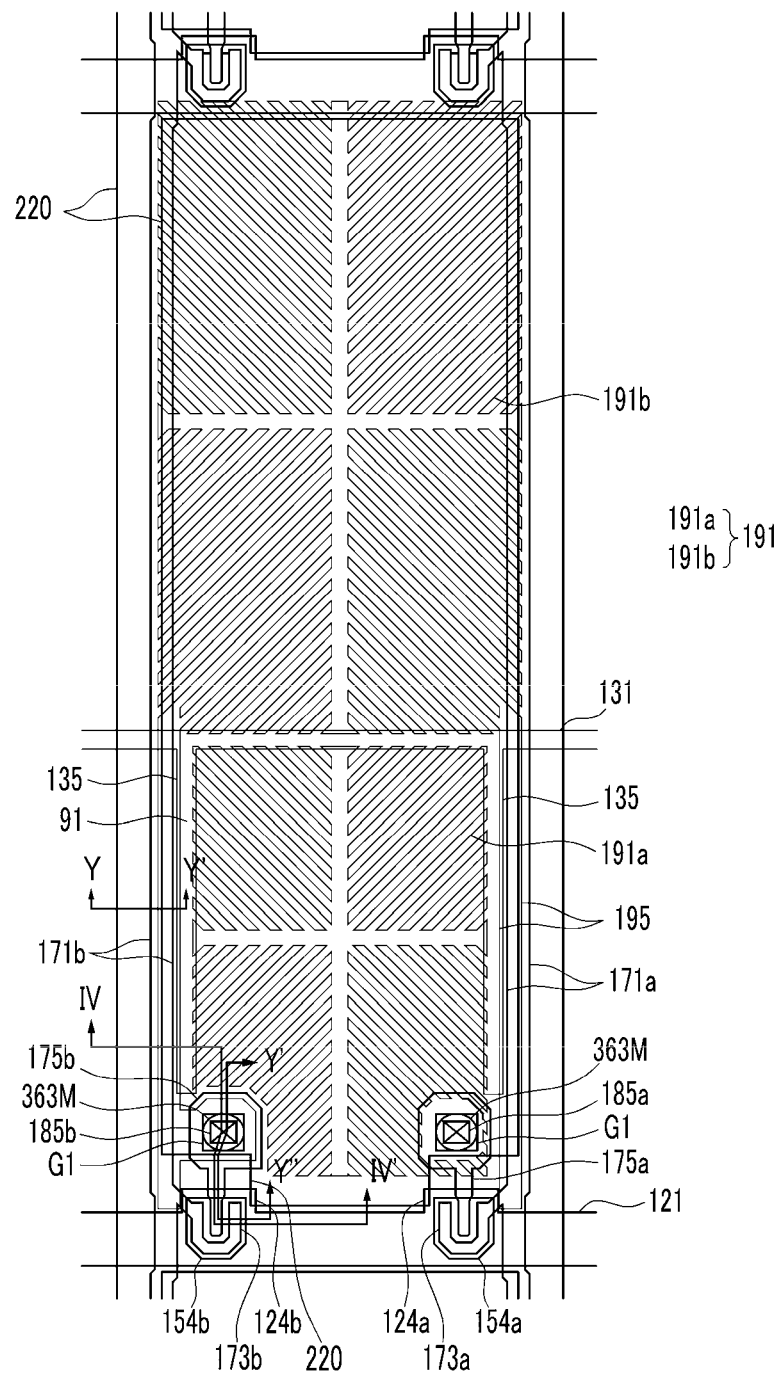
FIG. 3 is a view showing a region "A" of FIG. 1.
Figure 4:
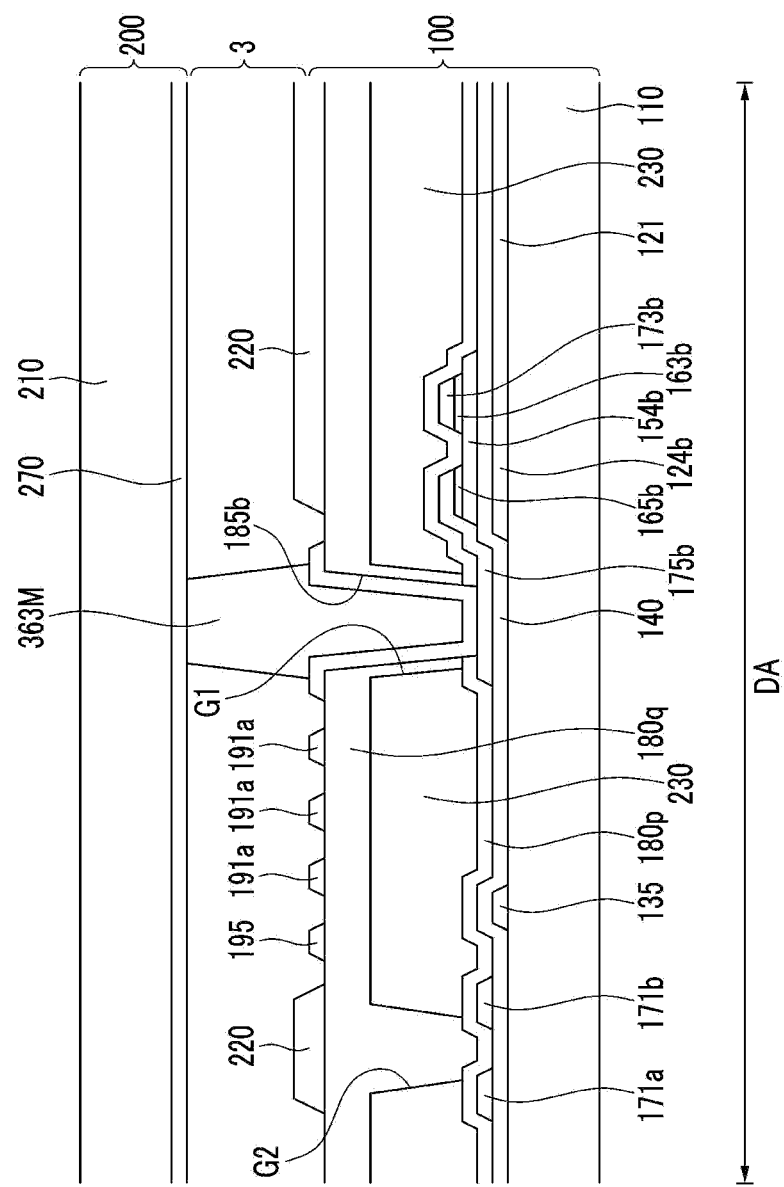
FIG. 4 is a cross-sectional view taken along line IV-IV' of FIG. 3.

FIG. 3 is a layout view of the "A" region of FIG. 1. FIG. 4 is a cross-sectional view of the LCD taken along line IV-IV' of FIG. 3.

Referring to FIG. 3 and FIG. 4, an LCD according to an exemplary embodiment of the present invention includes lower and upper display panels 100 and 200 facing each other, and a liquid crystal layer 3 interposed between the two panels 100 and 200.

The lower display panel 100 will now be described in detail.

A plurality of gate lines 121 and a plurality of storage electrode lines 131 and 135 are formed on an insulation substrate 110.

The gate lines 121 transmit gate signals, and proceed roughly in the transverse direction. The gate lines 121 each include a plurality of first and second gate electrodes 124a and 124b which protrude upward.

The storage electrode lines include stems 131 extending substantially parallel to the gate lines 121, and a plurality of storage electrodes 135 which protrude from the stems 131.

The shape and disposition of the storage electrode lines 131 and 135 may be altered in various manners.

A gate insulating layer 140 is formed on the gate lines 121 and the storage electrode lines 131 and 135, and a plurality of semiconductors 154a and 154b are formed on the gate insulating layer 140 using amorphous silicon or crystalline silicon.

A plurality of pairs of ohmic contacts 163b and 165b are formed on the semiconductors 154a and 154b. The ohmic contacts 163b and 165b may be formed using silicide or n+ hydrogenated amorphous silicon in which n-type impurities are doped at a high concentration.

A plurality of pairs of data lines 171a and 171b and a plurality of pairs of first and second drain electrodes 175a and 175b are formed on the ohmic contacts 163b and 165b and the gate insulating layer 140.

The data lines 171a and 171b transmit data signals, and proceed roughly in the column direction such that they cross the gate lines 121 and the stems 131 of the storage electrode lines. The data lines 171*a* and 171*b* include first and second source electrodes 173*a* and 173*b* bent toward the first and second gate electrode 124*a* and 124*b* in the shape of a letter "U". The first and second source electrodes 173*a* and 173*b* face the first and second drain electrodes 175*a* and 175*b* around the first and second gate electrodes 124*a* and 124*b*.

The first and second drain electrodes 175*a* and 175*b* include one end portion partially surrounded by the first and second source electrodes 173*a* and 173*b*, body portions extended upward from the end portions, and wide opposite end portions to be connected with other layers.

However, the shape and disposition of the data lines 171*a* and 171*b* including the first and second drain electrodes 175*a* and 175*b* may be altered in various manners.

The first and second gate electrodes 124*a* and 124*b*, the first and second source electrodes 173*a* and 173*b*, and the first and second drain electrodes 175*a* and 175*b* form first and second thin film transistors (TFT) Qa and Qb together with the first and second semiconductors 154*a* and 154*b*, and the channels of the first and second TFTs Qa and Qb are formed at the first and second semiconductors 154*a* and 154*b* between the first and second source electrodes 173*a* and 173*b* and the first and second drain electrodes 175*a* and 175*b*.

The ohmic contacts 163*b* and 165*b* exist only between the underlying semiconductors 154*a* and 154*b* and the overlying data lines 171*a* and 171*b* and drain electrodes 175*a* and 175*b* so as to lower the contact resistance therebetween. The semiconductors 154*a* and 154*b* have exposed portions not covered by the data lines 171*a* and 171*b* and the drain electrodes 175*a* and 175*b*, including a portion thereof between the source electrodes 173*a* and 173*b* and the drain electrodes 175*a* and 175*b*.

A lower passivation layer 180*p* is formed on the data lines 171*a* and 171*b*, the drain electrodes 175*a* and 175*b*, and the exposed portions of the semiconductors 154*a* and 154*b*, using silicon nitride or silicon oxide.

A color filter 230 is formed through a lithography process on the lower passivation layer 180*p*. The color filter 230 may be formed in a pixel area defined by the intersection of the gate line 121 and the data lines 171*a* and 171*b*, and the respective color filters 230 may express one of three primary colors of red, green, and blue. The left and right boundaries of the color filter 230 may be disposed on the data lines 171*a* and 171*b* and extend according to the data lines 171*a* and 171*b*. In this case, the color filter 230 may have a belt shape. Color filters 230 of the same color may not be adjacent to each other.

The color filter 230 may include a structure having a photosensitive organic composition and a pigment to realize full colors. For example, the color filter 230 may include pigments of red, green, or blue that are included in the photosensitive organic composition.

The color filter 230 may have an opening G1 and a groove G2. The opening G1 exposes the lower passivation layer 180*p* in the region where the first and second drain electrodes 175*a* and 175*b* and the pixel electrode 191 contact each other. The groove G2 is disposed between the neighboring data lines 171*a* and 171*b* between the pixel areas. In an exemplary embodiment, color filters 230 displaying different colors overlap each other between the neighboring data lines 171*a* and 171*b* between the pixel areas, and the groove G2 is not formed.

An upper passivation layer 180*q* made of an organic material or an inorganic material is formed on the lower passivation layer 180*p* and the color filter 230. The upper passivation layer 180*q* protects the color filter 230, and simultaneously flattens the underlying layers.

The lower passivation layer 180*p* may prevent the pigment of the color filter 230 from flowing into the exposed semiconductors 154*a* and 154*b*.

The upper passivation layer 180*q* has contact holes 185*a* and 185*b* exposing the drain electrodes 175*a* and 175*b*. The contact holes 185*a* and 185*b* are connected to and overlap the opening G1 of the color filter 230.

A plurality of pixel electrodes 191 are formed on the upper passivation layer 180*q*. The pixel electrodes 191 may be formed using a transparent conductive material such as Indium Tin Oxide (ITO) and Indium Zinc Oxide (IZO). The respective pixel electrodes 191 include first and second sub-pixel electrodes 191*a* and 191*b* separated from each other by a gap 91. The second sub-pixel electrode 191*b* includes a pair of branches 195 extending along the data line 171. The branches 195 are disposed between the first sub-pixel electrode 191*a* and the data lines 171*a* and 171*b*, and are connected to the bottom of the first sub-pixel electrode 191*a*. The first and second sub-pixel electrodes 191*a* and 191*b* are connected to the first and second drain electrodes 175*a* and 175*b* through the contact holes 185*a* and 185*b* so as to receive data voltages from the first and second drain electrodes 175*a* and 175*b*.

A light blocking member 220 is formed on the upper passivation layer 180*q*, and a main spacer 363M is formed on the pixel electrode 191. The light blocking member 220 is formed at a portion corresponding to the boundary of the pixel area and the first and second TFTs Qa and Qb. However, the light blocking member 220 is not formed where the pixel electrode 191 and the drain electrodes 175*a* and 175*b* contact each other. The main spacer 363M may be formed in the contact holes 185*a* and 185*b*.

The main spacer 363M fills the contact holes 185*a* and 185*b*, and extends toward the upper panel 200. The main spacer 363M functions to maintain the interval between the upper panel 200 and the lower panel 100. The main spacer 363M may contact the upper panel 200.

The light blocking member 220 and the main spacer 363M may be simultaneously formed, and may be made of a material such as a colored organic layer.

The thickness of the main spacer 363M may be greater than a height of a cell gap, the cell gap corresponding to the interval of the liquid crystal layer 3. The thickness of the main spacer 363M may be greater than the height of the cell gap by more than 1 μm.

When the height of the cell gap corresponding to the interval of the liquid crystal layer 3 is 3.6 μm and the area of the contact holes 185*a* and 185*b* is 22 μm*22 μm, the thickness of the main spacer 363M to maintain the height of the cell gap may be greater than 5.0 μm.

The light blocking member 220 may be formed with a thickness that is less than that of the main spacer 363M.

The contact holes 185*a* and 185*b* of the upper passivation layer 180*q* may have a slope such that the width thereof is decreased closer to the lower side. Accordingly, the width of the main spacer 363M formed in the contact holes 185*a* and 185*b* is decreased closer to a lower portion of the main spacer 363M compared to a middle portion of the main spacer 363M according to the shape of the contact holes 185*a* and 185*b*. On the other hand, the width of the main spacer 363M formed on the upper passivation layer 180*q* may be decreased closer to an upper portion of the main spacer 363M compared to a middle portion of the main spacer 363M.

The main spacer 363M according to an exemplary embodiment of the present invention is filled in the contact holes 185a and 185b such that when an external force is applied, the force is dispersed in a wide area, and thereby a smear defect may be decreased. The smear defect occurs when the elasticity of the spacer is damaged by external pressure.

The panel 200 will now be described in detail.

In the upper display panel 200, a common electrode 270 is formed on the entire surface of a transparent insulation substrate 210, and an alignment layer (not shown) is formed on the common electrode 270.

Figure 5:
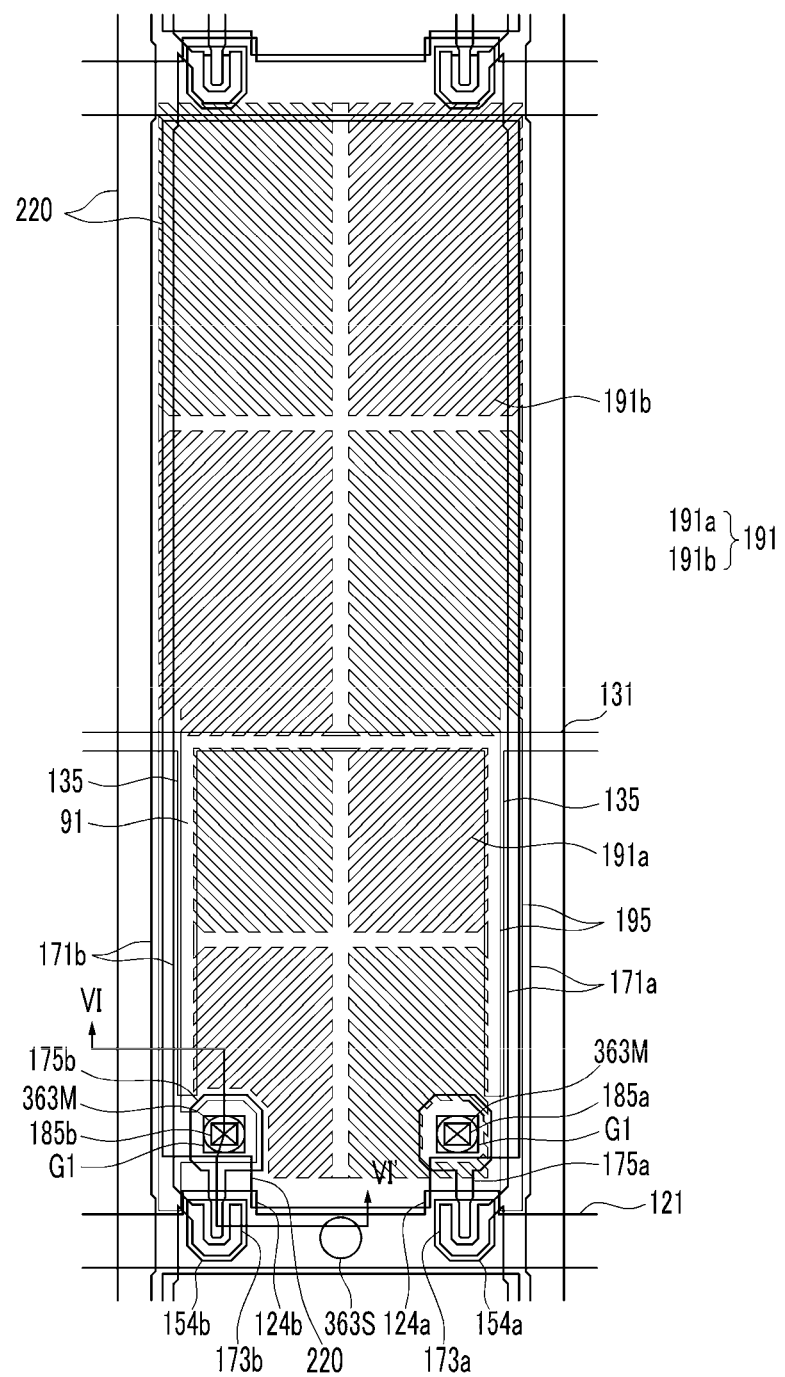
FIG. 5 is a layout view of a LCD according to an exemplary embodiment of the present invention, showing the region A of FIG. 1.
Figure 6:
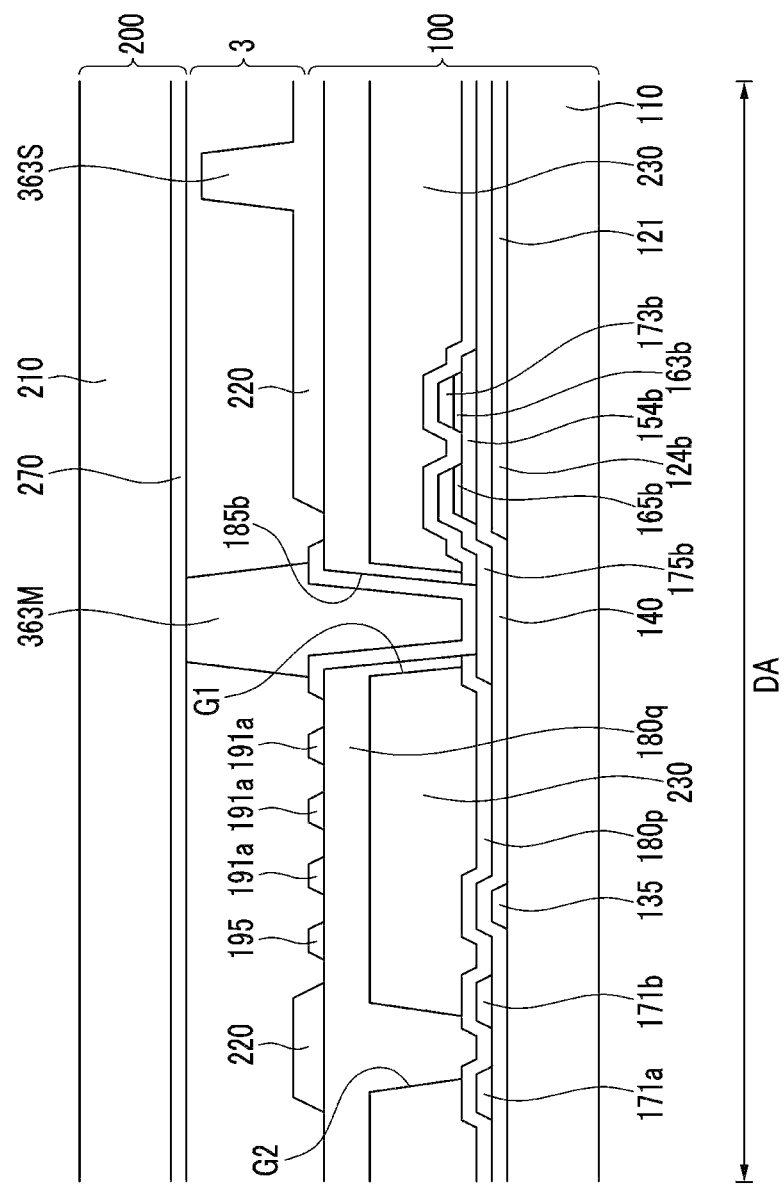
FIG. 6 is a cross-sectional view taken along line VI-VI' of FIG. 5.

FIG. 5 is a layout view of an LCD according to an exemplary embodiment of the present invention, showing the "A" portion of FIG. 1. FIG. 6 is a cross-sectional view taken along line VI-VI' of FIG. 5.

The exemplary embodiment shown in FIG. 5 and FIG. 6 has almost the same configuration as the exemplary embodiment shown in FIG. 3 and FIG. 4. However, the LCD according to the exemplary embodiment shown in FIG. 5 and FIG. 6 further includes an assistance spacer 363S formed on the gate line 121.

The assistance spacer 363S may be formed along with the main spacer 363M, and may be further away from the upper panel 200 than the main spacer 363M. However, the assistance spacer 363S may be closer to the upper panel 200 than the light blocking member 220. The assistance spacer 363S maintains the height of the cell gap along with the main spacer 363M.

Figure 7:
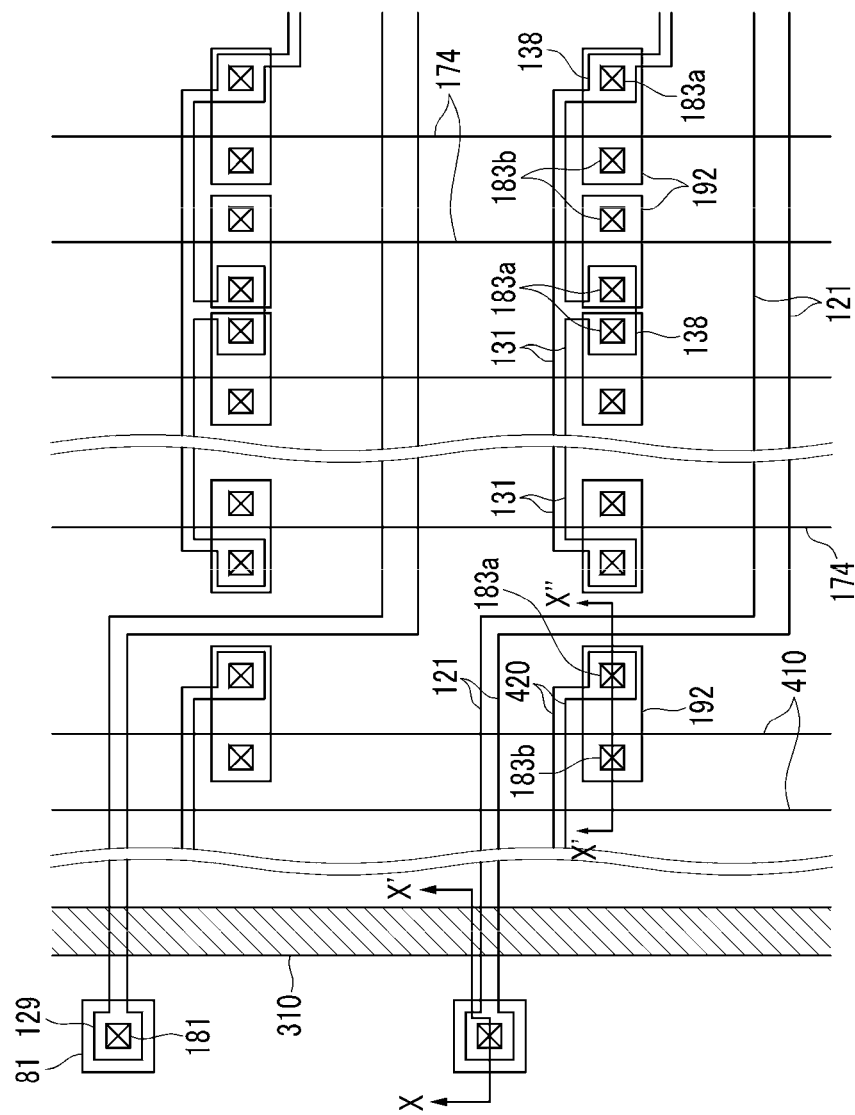
FIG. 7 is a layout view of a region "B" of FIG. 1.
Figure 8:
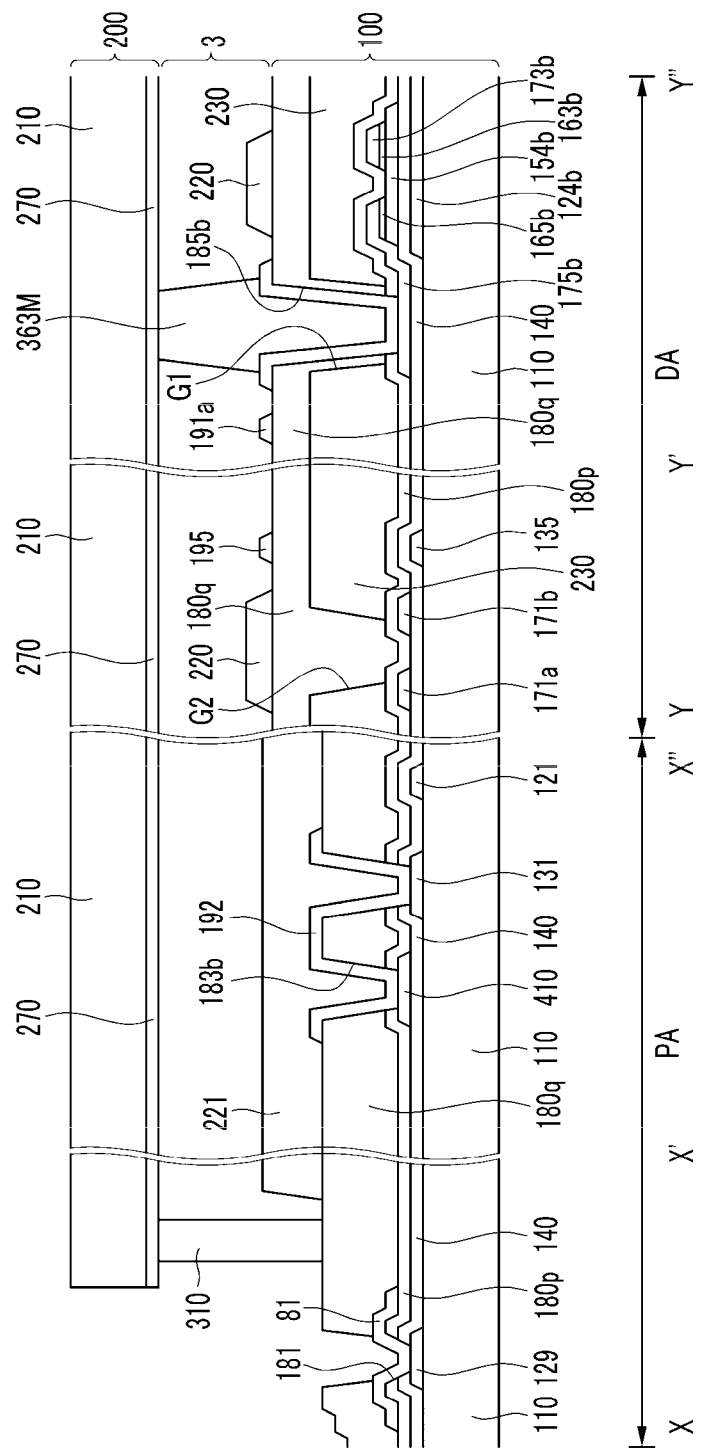
FIG. 8 is cross-sectional view taken along lines X-X' and X'-X'' of FIG. 7 and lines Y-Y' and Y'-Y''' of FIG. 3.

FIG. 7 is a layout view of the "B" region of FIG. 1. FIG. 8 is a cross-sectional view taken along lines X-X' and X'-X" of FIG. 7 and lines Y-Y' and Y'-Y''' of FIG. 3.

Referring to FIG. 7, contact assistants 81 are connected to end portions 129 of the gate lines 121 through contact holes 181, respectively. The contact assistants 81 assist the adhesion of the end portions 129 of the gate lines 121 to external devices, and protect them. Although not shown, the end portions of the data lines 171 may have a similar configuration as end portions 129 of the gate lines 121, and contact assistants may be connected to end portions of the data lines 171.

Images are displayed at the display area DA of the LCD, and a light blocking member 221 is formed at the non-display area PA. The light blocking member 221 of the non-display area PA is formed on the upper passivation layer 180q. In FIG. 8, the light blocking member 221 is formed inside the sealant 310, however it may be formed under or outside the sealant 310.

The storage electrode line 131 extends on the left and right sides of the non-display area PA of the LCD roughly in the row direction while standing on the same plane as the gate line 121. The storage electrode line 131 includes outer storage electrodes 138. The outer storage electrode 138 may be roughly square-shaped or rectangular-shaped.

A plurality of storage electrode line connecting members 174 extend on the left and right sides of the non-display area PA of the LCD roughly in the column direction while standing on the same plane as the data lines 171.

Transparent connectors 192 electrically connect the storage electrode line connecting members 174 and the outer storage electrodes 138 with each other. Contact holes 183b are formed at the contact area between the transparent connectors 192 and the storage electrode line connecting members 174, and other contact holes 183a are formed at the contact area between the transparent connectors 192 and the outer storage electrodes 138. Alternatively, the outer storage electrodes 138 and the storage electrode line connecting members 174 may be omitted.

A gate driver 400 is formed on the left and right sides of the non-display area PA of the LCD and is connected to the gate lines 121. The gate driver 400 includes data signal lines 410 and gate signal lines 420, which are electrically connected to each other via transparent connectors 192. The gate signal lines 420 of the gate driver 400 are formed on the same plane as the gate lines 121, and the data signal lines 410 of the gate driver 400 are formed on the same plane as the data lines 171. The contact holes 183b are formed at the contact area between the transparent connectors 192 and the data signal lines 410 of the gate driver 400, and the contact holes 183a are formed at the contact area between the transparent connectors 192 and the gate signal lines 420 of the gate driver 400. Alternatively, the gate driver 400 may not be formed on the lower display panel 100, but may be formed on a separate IC chip, and in this case, the contact holes 183a and 183b through which the transparent connectors 192 contact the data signal line 410 or the gate signal line 420 of the gate driver 400 do not exist.

The features of the non-display area PA of an LCD according to an exemplary embodiment of the present invention, and details relevant to the display area DA thereof, will now be described Here, the light blocking member 221 formed in the non-display area PA and the light blocking member 220 formed in the display area DA are respectively described as the first light blocking member 221 and the second light blocking member 220.

The first light blocking member 221 may cover all portions where the light leakage may be generated on the insulation substrate 110 of the non-display area PA. The first light blocking member 221 may be simultaneously formed with the second light blocking member 220 and the main spacer 363M of the display area DA. Also, the first light blocking member 221 may be formed using the same material as the second light blocking member 220 and the main spacer 363M of the display area DA.

The first light blocking member 221 may be formed using the colored organic layer, and have an optical density of 4 to 5. The first light blocking member 221 may have an optical density of more than 4 to substantially prevent the light leakage. The first light blocking member 221 is further away from the upper panel 200 than the main spacer 363M. Here, the first light blocking member 221 may be thinner than the main spacer 363M by more than 1 μm.

According to an exemplary embodiment of the present invention, the main spacer 363M of the display area DA is formed in the contact holes 185a and 185b through which the pixel electrode 191 and the drain electrodes 175a and 175b are contacted with each other. Thus, the thickness of the main spacer 363M that is greater than 5.0 μm may be formed while maintaining a height of the cell gap of about 3.6 μm.

The main spacer 363M may be disposed at the portion where the organic layer or the inorganic layer is removed such as at the contact holes 185a and 185b. Therefore, the coating thickness may be increased when coating the main spacer 363M and the first light blocking member 221 of the non-display area PA, and the thickness of the first light blocking member 221 may also be increased.

Although the main spacer 363M may be formed with a thickness of 3.6 μm, the first light blocking member 221 of the non-display area PA may be formed with a thickness of more than 4.0 μm such that the optical density is more than 4. Accordingly, the first light blocking member 221 may prevent the light leakage.

Next, a manufacturing method of an LCD according to an exemplary embodiment of the present invention will be described with reference to FIG. 7 and FIG. 8.

The TFT Qb including the gate electrode 124b, the source electrode 173b, the drain electrode 175b, and the semiconductor 154b is formed on the insulation substrate 110 including the display area DA and the non-display area PA.

A lower passivation layer 180p made of silicon nitride or silicon oxide is formed on the TFT Qb, and a color filter 230 having an opening G1 and a groove G2 is formed through a lithography process.

An upper passivation layer 180q having a contact hole 185b exposing the drain electrode 175b is formed on the lower passivation layer 180p and the color filter 230.

The first light blocking member 221 of the non-display area PA, the second light blocking member 220 of the display area DA, and the main spacer 363M on the pixel electrode 191 are formed on the upper passivation layer 180q. The main spacer 363M maintains the interval between the upper panel 200 and the lower panel 100.

The first light blocking member 221 may be simultaneously formed with the second light blocking member 220 and the main spacer 363M of the display area DA. Here, a step of reducing the thickness of the first light blocking member 221 compared with the thickness of the main spacer 363M may be executed by using a translucent mask.

Also, the main spacer 363M may have a width that decreases closer to the upper and lower portions of the main spacer 363M compared to a middle portion of the main spacer 363M.

Next, the upper panel 200 including the common electrode 270 formed on the insulation substrate 210 and the lower panel 100 are combined.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display including a display area and a non-display area, comprising:
    a first substrate;
    a second substrate facing the first substrate;
    a color filter disposed on the first substrate;
    a layer disposed on the color filter and disposed at the display area and the non-display area, the layer comprising a contact hole at the display area;
    a pixel electrode disposed on the layer;
    a main spacer overlapping the contact hole and protruding from the contact hole toward the second substrate, the main spacer maintaining an interval between the first substrate and the second substrate;
    an assistance spacer to maintain an interval between the first substrate and the second substrate; and
    a first light blocking member disposed in the non-display area,
    wherein the main spacer and the first light blocking member comprise the same material, and
    wherein the assistance spacer is further away from the second substrate than the main spacer, and
    wherein the first light blocking member is thinner than the main spacer.

2. The liquid crystal display of claim 1, wherein the main spacer and the assistance spacer comprise the same material.

3. The liquid crystal display of claim 1, further comprising:
    a thin film transistor disposed on the first substrate;
    a passivation layer disposed on the thin film transistor; and
    a pixel electrode disposed on the passivation layer,
    wherein the pixel electrode is connected to a drain electrode of the thin film transistor through the contact hole.

4. The liquid crystal display of claim 1, wherein a thickness of the main spacer is greater than a height of a cell gap.

5. The liquid crystal display of claim 4, wherein the thickness of the main spacer is greater than the height of the cell gap by more than 1.0 μm.

6. The liquid crystal display of claim 5, wherein the thickness of the main spacer is greater than 5.0 μm.

7. The liquid crystal display of claim 6, wherein a width of the main spacer is decreased in an upper portion and a lower portion of the main spacer compared to a middle portion of the main spacer.

8. The liquid crystal display of claim 1, wherein the assistance spacer is closer to the second substrate than the first light blocking member.

9. The liquid crystal display of claim 1, further comprising:
    a second light blocking member disposed in the display area,
    wherein the first light blocking member and the second light blocking member comprise the same material.

10. The liquid crystal display of claim 9, wherein the assistance spacer is closer to the second substrate than the second light blocking member.

11. A method for manufacturing a liquid crystal display comprising a display area and a non-display area, the method comprising:
    forming a color filter on a first substrate;
    forming a layer on a first substrate at the display area and the non-display area, the layer comprising a contact hole at the display area and covering the color filter at the display area;
    forming a pixel electrode on the layer;
    forming a main spacer overlapping the contact hole, the main spacer extending from the contact hole toward a second substrate and maintaining an interval between the first substrate and the second substrate;
    forming an assistance spacer to maintain an interval between the first substrate and the second substrate; and
    forming a first light blocking member disposed in the non-display area,
    wherein the forming of the first light blocking member and the main spacer comprises using a translucent mask to reduce the thickness of the first light blocking member compared with the thickness of the main spacer; and
    wherein the assistance spacer is further away from the second substrate than the main spacer, and
    wherein the first light blocking member is thinner than the main spacer.

12. The method of claim 11, wherein the main spacer and the assistance spacer are simultaneously formed.

13. The method of claim 11, further comprising:
    forming a thin film transistor on the first substrate;
    forming a passivation layer on the thin film transistor; and
    forming a pixel electrode on the passivation layer, wherein the pixel electrode is connected to a drain electrode of the thin film transistor through the contact hole.

14. The liquid crystal display of claim 11,
wherein the main spacer and the first light blocking member are simultaneously formed.

15. The liquid crystal display of claim 14, further comprising:
forming a second light blocking member in the display area,
wherein the first light blocking member and the second light blocking member are simultaneously formed.

16. The liquid crystal display of claim 15, wherein the assistance spacer is closer to the second substrate than the second light blocking member.

17. The method of claim 12, wherein the main spacer is formed to have a width that is decreased in an upper and a lower portion of the main spacer compared to a middle portion of the main spacer.

* * * * *